(12) United States Patent
Mizutani et al.

(10) Patent No.: US 8,020,653 B2
(45) Date of Patent: Sep. 20, 2011

(54) VIBRATION DAMPING MEMBER FOR IN-WHEEL MOTOR

(75) Inventors: Ryoji Mizutani, Nishikamo-gun (JP); Michitaka Tsuchida, Susono (JP); Yasuaki Tahara, Nagoya (JP); Atsushi Torii, Nishio (JP); Yuki Tojima, Chita-gun (JP)

(73) Assignees: Toyota Jidosha Kabushiki Kaisha, Aichi-Ken (JP); Aisin Seiki Kabushiki Kaisha, Aichi-ken (JP)

( * ) Notice: Subject to any disclaimer, the term of this patent is extended or adjusted under 35 U.S.C. 154(b) by 254 days.

(21) Appl. No.: 12/162,227

(22) PCT Filed: Jan. 19, 2007

(86) PCT No.: PCT/JP2007/051220
§ 371 (c)(1),
(2), (4) Date: Jul. 25, 2008

(87) PCT Pub. No.: WO2007/086488
PCT Pub. Date: Aug. 2, 2007

(65) Prior Publication Data
US 2009/0166111 A1    Jul. 2, 2009

(30) Foreign Application Priority Data

Jan. 27, 2006 (JP) .................................. 2006-019312

(51) Int. Cl.
*B60K 1/00* (2006.01)
(52) U.S. Cl. .................................................. 180/65.51

(58) Field of Classification Search ............... 180/65.51, 180/291, 55, 65.1, 65.275, 65.6, 308, 6.48, 180/242, 243, 65.5, 21; 903/906
See application file for complete search history.

(56) References Cited

U.S. PATENT DOCUMENTS

| | | | | |
|---|---|---|---|---|
| 1,171,722 A | * | 2/1916 | Hough | 267/196 |
| 3,147,964 A | * | 9/1964 | Wolf | 267/292 |
| 3,912,296 A | * | 10/1975 | Allison et al. | 280/124.163 |
| 4,756,517 A | * | 7/1988 | Kakimoto | 267/220 |
| 4,801,129 A | * | 1/1989 | Wells | 267/52 |
| 4,880,318 A | * | 11/1989 | Shibahara et al. | 384/125 |
| 5,087,229 A | * | 2/1992 | Hewko et al. | 475/149 |
| 5,180,180 A | * | 1/1993 | Yamashita et al. | 180/253 |
| 5,338,055 A | * | 8/1994 | Mauz | 280/124.147 |
| 6,612,620 B1 | * | 9/2003 | Nordstrom et al. | 285/139.1 |
| 6,641,151 B1 | * | 11/2003 | Zetterstrom | 280/124.107 |

(Continued)

FOREIGN PATENT DOCUMENTS

JP           63-041243 A      2/1988

(Continued)

OTHER PUBLICATIONS

Notice of Grounds of Rejection for Japanese Patent Application No. 2006-019312 dated May 10, 2011 (English Translation).

*Primary Examiner* — J. Allen Shriver, II
*Assistant Examiner* — Brodie Follman
(74) *Attorney, Agent, or Firm* — Sughrue Mion, PLLC (57) ABSTRACT

An in-wheel motor includes a rotating electric machine provided at a wheel and applying driving force to the wheel, a housing housing the rotating electric machine and rotatably supporting the wheel, and a vibration damping member provided between the housing and a ball joint as a mounting portion for mounting the housing on a vehicle body.

11 Claims, 4 Drawing Sheets

U.S. PATENT DOCUMENTS

| | | | |
|---|---|---|---|
| 6,666,438 B2 * | 12/2003 | Nakagawa | 267/141.2 |
| 6,942,049 B2 * | 9/2005 | Shimizu | 180/65.6 |
| 7,216,731 B2 * | 5/2007 | Kakinami et al. | 180/65.51 |
| 7,228,928 B2 * | 6/2007 | Mizutani et al. | 180/65.51 |
| 7,243,749 B2 * | 7/2007 | Kakinami et al. | 180/65.51 |
| 7,287,611 B2 * | 10/2007 | Nagaya | 180/65.51 |
| 7,306,065 B2 * | 12/2007 | Nagaya | 180/65.51 |
| 7,347,295 B2 * | 3/2008 | Kurata | 180/65.51 |
| 7,350,605 B2 * | 4/2008 | Mizutani et al. | 180/65.51 |
| 7,413,203 B2 * | 8/2008 | Kurata | 280/124.156 |
| 7,423,393 B2 * | 9/2008 | Wakao et al. | 318/371 |
| 7,641,010 B2 * | 1/2010 | Mizutani et al. | 180/65.51 |
| 7,703,780 B2 * | 4/2010 | Mizutani et al. | 280/124.1 |
| 2002/0089230 A1 * | 7/2002 | Seimiya | 301/35.627 |
| 2002/0160131 A1 * | 10/2002 | Ohira et al. | 428/35.7 |
| 2004/0080223 A1 * | 4/2004 | Shimizu | 310/75 C |
| 2004/0099455 A1 * | 5/2004 | Nagaya | 180/65.5 |
| 2005/0045393 A1 * | 3/2005 | Mizutani et al. | 180/65.5 |
| 2005/0061565 A1 * | 3/2005 | Mizutani et al. | 180/65.5 |
| 2005/0194210 A1 * | 9/2005 | Panossian | 181/293 |
| 2005/0247496 A1 * | 11/2005 | Nagaya | 180/65.5 |
| 2005/0257970 A1 | 11/2005 | Kakinami et al. | |
| 2005/0257971 A1 * | 11/2005 | Kakinami et al. | 180/65.5 |
| 2005/0274560 A1 * | 12/2005 | Wakao et al. | 180/197 |
| 2006/0048978 A1 * | 3/2006 | Nagaya | 180/6.48 |
| 2006/0076740 A1 * | 4/2006 | Sugiyama | 280/5.502 |
| 2006/0144626 A1 * | 7/2006 | Mizutani et al. | 180/65.5 |
| 2006/0219449 A1 * | 10/2006 | Mizutani et al. | 180/65.5 |
| 2006/0225931 A1 * | 10/2006 | Kurata | 180/65.5 |
| 2007/0068715 A1 * | 3/2007 | Mizutani et al. | 180/65.5 |
| 2007/0246277 A1 * | 10/2007 | Mizutani et al. | 180/65.5 |
| 2008/0017462 A1 * | 1/2008 | Mizutani et al. | 188/266.1 |
| 2008/0093133 A1 * | 4/2008 | Yogo et al. | 180/55 |
| 2008/0163453 A1 * | 7/2008 | Joseph | 16/2.1 |
| 2008/0174082 A1 * | 7/2008 | Bunker | 280/124.109 |
| 2008/0289891 A1 * | 11/2008 | Yogo et al. | 180/65.5 |
| 2009/0025991 A1 * | 1/2009 | Moriguchi et al. | 180/65.5 |
| 2009/0038865 A1 * | 2/2009 | Moriguchi et al. | 180/55 |
| 2009/0133944 A1 * | 5/2009 | Nishioka et al. | 180/65.51 |
| 2009/0166111 A1 * | 7/2009 | Mizutani et al. | 180/65.51 |
| 2009/0236158 A1 * | 9/2009 | Sakuma et al. | 180/65.51 |
| 2010/0000811 A1 * | 1/2010 | Iwano | 180/65.51 |
| 2010/0038876 A1 * | 2/2010 | Bunker | 280/124.134 |
| 2010/0163319 A1 * | 7/2010 | Murata et al. | 180/55 |

FOREIGN PATENT DOCUMENTS

| | | |
|---|---|---|
| JP | 05-022832 U | 3/1993 |
| JP | 05-162542 A | 6/1993 |
| JP | 2005-104166 A | 4/2005 |
| JP | 2005-119548 A | 5/2005 |
| JP | 2005126037 A * | 5/2005 |
| JP | 2005-199756 A | 7/2005 |
| JP | 2005-225486 A | 8/2005 |
| JP | 2005-238935 A | 9/2005 |
| JP | 2005-238936 A | 9/2005 |
| JP | 2005-329757 A | 12/2005 |

* cited by examiner

VIBRATION DAMPING MEMBER FOR IN-WHEEL MOTOR

TECHNICAL FIELD

The present invention relates to an in-wheel motor and, specifically, to a technique for preventing transmission of high-frequency vibration caused by torque reaction force of a rotating electric machine provided in a wheel to the side of vehicle body.

BACKGROUND ART

Recently, as a solution to environmental problems, hybrid vehicles, fuel cell vehicles and electric vehicles that run by the driving force from a motor have been attracting attention. Such a vehicle mounts a motor as a driving source, and while the vehicle travels, the motor may generate vibration and noise. In view of such a problem, Japanese Patent Laying-Open No. 5-162542 discloses an electric vehicle driving device that aims to realize both improved vehicle installability and reduced noise and vibration. The driving device is characterized in that, in an electric vehicle including a plurality of driving motors, motor bodies are coupled through a vibration control member. The driving device is further characterized in that, in the electric vehicle including a plurality of driving motors, the motor body is mounted on a vehicle body with the vibration control member interposed.

According to the driving device for an electric vehicle disclosed in the laid-open application, even in a type in which motors of the electric vehicle are coupled to each other, vibration generating actions of each other are restrained, whereby transmission of vibration can be reduced. Further, both improved installability of motors and reduced vibration and noise can be attained. In addition, durability of motors themselves, quietness of the vehicle, and stability in running can be improved.

Further, as an electric vehicle having a motor as a driving source, not only a vehicle having the motor on the side of vehicle body but also a vehicle having an in-wheel motor in its wheel has been known.

The vehicle provided with an in-wheel motor, however, has a problem that vibration generated in the in-wheel motor is transmitted to the side of vehicle body. The vibration and noise generated when the motor is driven are in the frequency band of several hundred Hz to several kHz, caused by rotor rotation or gear meshing. Such vibration is particularly notable when the vehicle speed is increased and decreased.

A housing of the in-wheel motor is mounted on a suspension through a ball joint. Between the ball and a receptacle of the ball joint, grease is filled. The ball joint receives torque reaction force of motor when the vehicle speed is increased and decreased. When the ball joint receives the torque reaction force, the ball is brought into contact with the receptacle or a wall surface in the ball joint. When the ball contacts the receptacle or wall surface in the ball joint, degree of transmission of vibration generated in the in-wheel motor through a suspension (that is, lower and upper arms) to the vehicle body increases (in other words, vibration tends to be transmitted easily). As a result, vibration and resultant noise are generated in the vehicle interior, possibly causing sense of discomfort of persons in the vehicle.

At a root portion of a shock absorber or at a mounting portion between the suspension and the vehicle body, a vibration damping member such as a rubber bush is provided. This realizes a structure in which shock or vibration from the road surface is not transmitted to the vehicle interior. The rubber bush, however, corresponds only to input vibration of about 10 to about 15 Hz from the road surface. Therefore, high-frequency noise generated in the in-wheel motor cannot be reduced.

In the electric vehicle driving device disclosed in the laid-open application, the motor is mounted on the side of vehicle body through a vibration control member. Specific technique for preventing high-frequency vibration transmitted from the in-wheel motor to the vehicle body when the vehicle speed is increased and decreased is not disclosed at all.

DISCLOSURE OF THE INVENTION

An object of the present invention is to provide an in-wheel motor preventing high-frequency vibration transmitted to the vehicle body when vehicle speed is increased and decreased.

According to an aspect, the present invention provides an in-wheel motor, including: a rotating electric machine applying a driving force to the wheel; a rotation support member as a housing of the rotating electric machine rotatably supporting the wheel; and a vibration damping member provided between the rotation support member and a mounting portion for mounting the rotation support member to a vehicle body.

In the present invention, between the mounting portion (such as a ball joint) for mounting the rotation support member (such as the housing of rotating electric machine) to the vehicle body and the rotation support member, the vibration damping member is provided. By way of example, assume that a member that curbs high-frequency vibration generated in the rotating electric machine is used as the vibration damping member. In that case, even if torque reaction force of the rotating electric machine is applied to the mounting portion when the vehicle speed is increased and decreased and the degree of vibration transmission from the rotation support member to the vehicle body increases at the mounting portion, transmission of the high-frequency vibration to the vehicle body can be curbed by the vibration damping member. Therefore, an in-wheel motor that curbs high-frequency vibration transmitted to the vehicle body when vehicle speed is increased and decreased can be provided.

Preferably, the vibration damping member curbs vibration of a predetermined frequency band, of the vibrations generated by torque reaction force of the rotating electric machine when speed of the vehicle increases and decreases.

According to the present invention, between the mounting portion (such as a ball joint) and the rotation support member (such as the housing of rotating electric machine), a member is provided for curbing vibration of a predetermined frequency band among the vibrations generated from torque reaction force of rotating electric machine when the vehicle speed is increased and decreased. Therefore, even if torque reaction force of the rotating electric machine is applied to the mounting portion when the vehicle speed is increased and decreased and the degree of vibration transmission from the rotation support member to the vehicle body increases at the mounting portion, transmission of vibration of the predetermined frequency band (such as the frequency band of high-frequency vibration generated in the rotating electric machine) to the vehicle body can be curbed by the vibration damping member.

More preferably, the predetermined frequency band is higher than frequency band of vibration curbed by a vibration damping member provided closer to the vehicle body than the mounting portion.

According to the present invention, between the mounting portion (such as a ball joint) and the rotation support member (such as the housing of rotating electric machine), a vibration damping member is provided, which curbs vibration in a frequency band (for example, frequency band that corresponds to the high-frequency vibration generated in the rotating electric machine) higher than that addressed by the vibration damping member provided closer to the vehicle body than the mounting portion (such as the rubber bush that absorbs vibration of 10 to 15 Hz from the road surface). Therefore, even if torque reaction force of the rotating electric machine is applied to the mounting portion when the vehicle speed is increased and decreased and the degree of vibration transmission from the rotation support member to the vehicle body increases at the mounting portion, transmission of vibration of the frequency band higher than that addressed by the vibration damping member provided closer to the vehicle body than the mounting portion to the vehicle body can be curbed by the vibration damping member.

More preferably, the vibration damping members are provided at positions off-set by a prescribed amount from where a vertical line passes at the mounting portions to the front and rear sides of the vehicle, respectively.

According to the present invention, the vibration damping members are provided at positions off-set by a prescribed amount from where the vertical line passes at the mounting portion (such as the ball joint) to the front and rear sides of the vehicle, respectively. Therefore, even if torque reaction force of the rotating electric machine is applied to the mounting portion when the vehicle speed is increased and decreased and the degree of transmission of high-frequency vibration generated in the rotating electric machine to the vehicle body increases at the mounting portion, the high-frequency vibration transmitted from the rotation support member to the vehicle body can effectively be curbed, as the vibration damping members are provided at portions where degree of transmission is high.

More preferably, the wheel is a steering wheel that rotates and turns to the steering direction when steered. A suspension arm is provided on the rotation support member for suspending the vehicle body through the mounting portion. The mounting portion supports the rotation support member such that the wheel freely rotates in the steering direction with respect to the vehicle body and supports the rotation support member such that the wheel freely swings upward/downward with respect to the vehicle body.

According to the present invention, the mounting portion (such as the ball joint) supports the rotation support member (such as the housing of rotating electric machine) such that the wheel is freely rotatable in the steering direction with respect to the vehicle body, and supports the rotation support member such that the wheel freely swings upward/downward with respect to the vehicle body. By providing the vibration damping member between the rotation support member and the mounting portion having such a structure, transmission of high-frequency vibration generated in the rotating electric machine to the vehicle can be prevented.

More preferably, the mounting portion is a ball joint.

According to the present invention, even if torque reaction force of the rotating electric machine is applied to the ball joint when the vehicle speed is increased and decreased and the degree of transmission of vibration from the rotation support member to the vehicle body increases at the ball joint, high-frequency vibration generated in the rotating electric machine can be curbed by the vibration damping member.

BEST MODES FOR CARRYING OUT THE INVENTION

In the following, an embodiment of the present invention will be described with reference to the figures. In the following description, same components are dented by the same reference characters. Their names and functions are also the same. Therefore, detailed description thereof will not be repeated.

Figure 1:
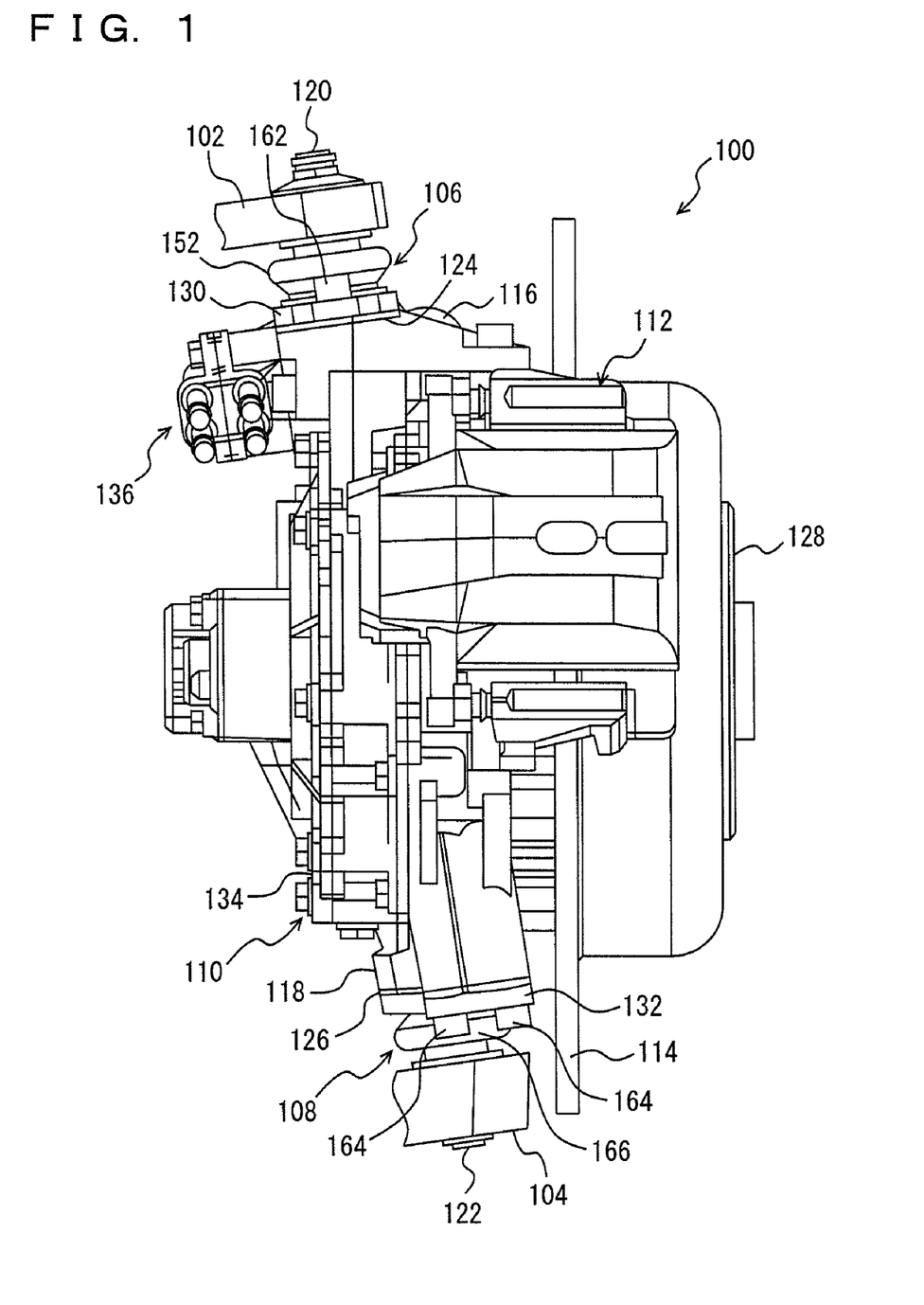
FIG. 1 is a front view of an in-wheel motor in accordance with an embodiment.
Figure 2:
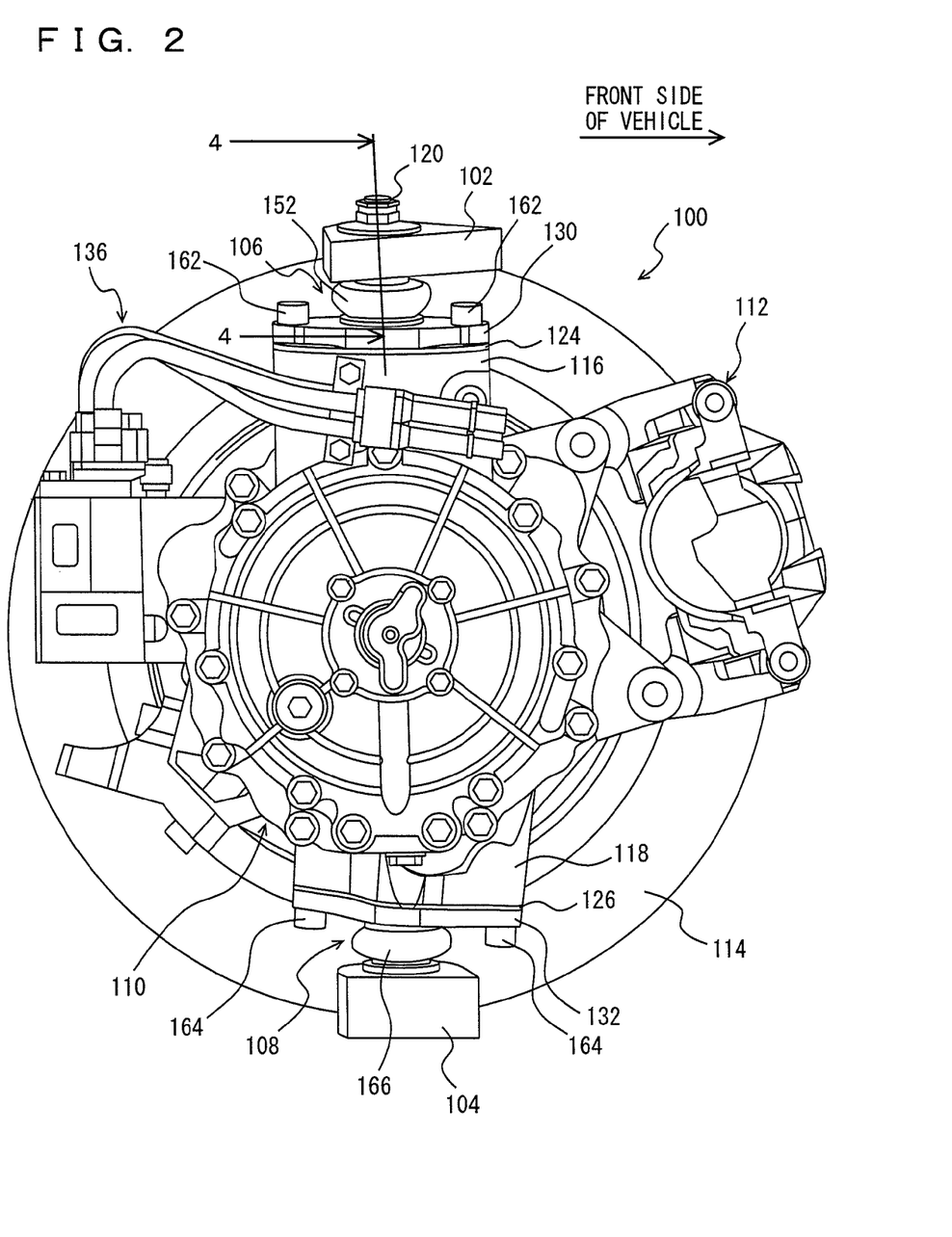
FIG. 2 is a side view of the in-wheel motor in accordance with the embodiment.
Figure 3:
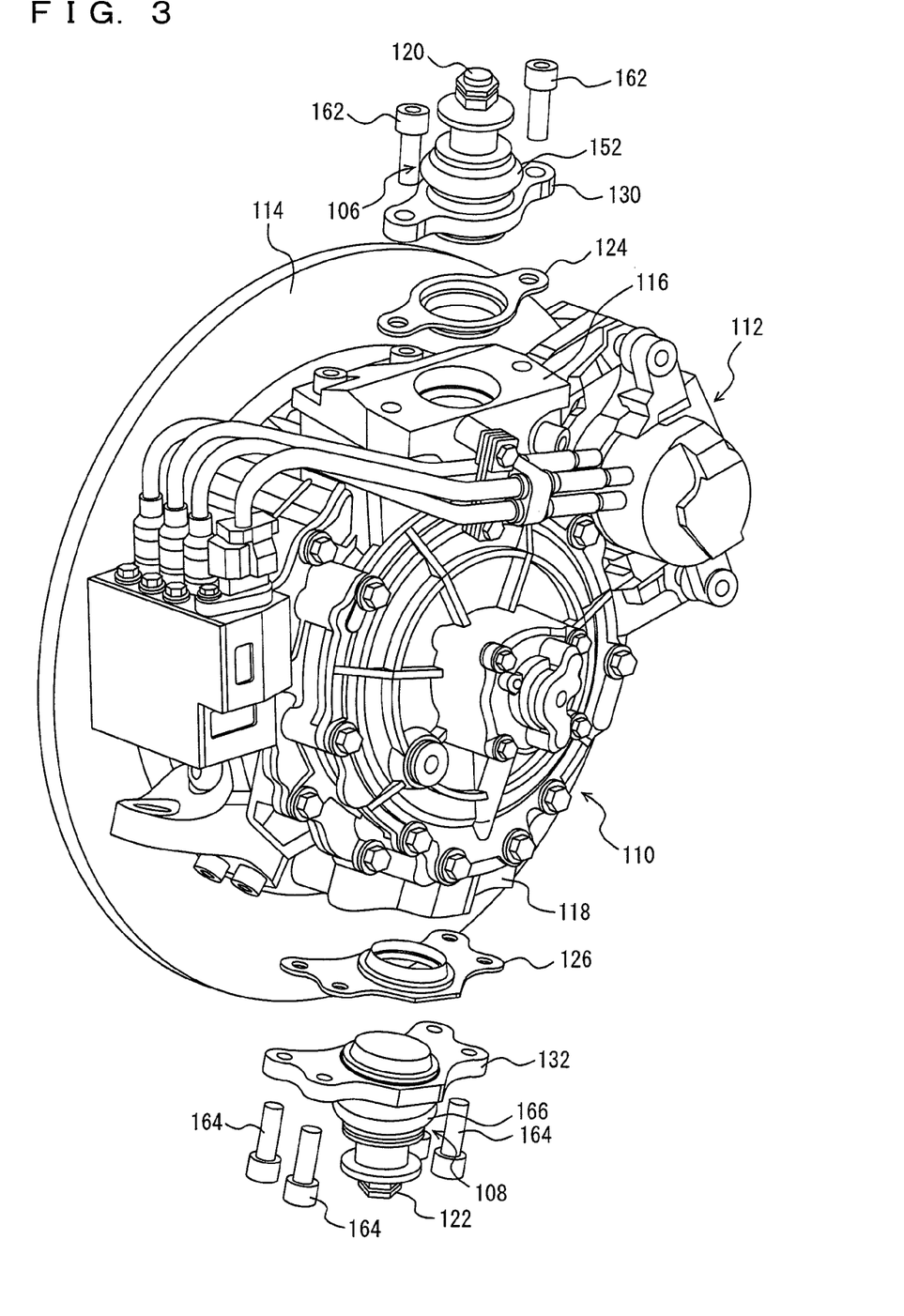
FIG. 3 is a perspective view of the in-wheel motor in accordance with the embodiment.

FIG. 1 is a front view of an in-wheel motor in accordance with the present embodiment. FIG. 2 is a side view of the in-wheel motor in accordance with the present embodiment, from the central to the outer side of the wheel. FIG. 3 is a perspective view of the in-wheel motor in accordance with the present embodiment.

In-wheel motor 100 shown in FIGS. 1 to 3 may be an in-wheel motor corresponding to a front wheel, or an in-wheel motor corresponding to a rear wheel, and it is not specifically limited. In the present embodiment, in-wheel motor 100 is described as an in-wheel motor that corresponds to the front wheel. FIGS. 1-3 show the in-wheel motor of the left front wheel, and the structure of an in-wheel motor of the right front wheel is the same as that of the in-wheel motor of the left front wheel. Therefore, detailed description will not be repeated.

In-wheel motor 100 in accordance with the present embodiment includes, as shown in FIGS. 1-3, a rotating electric machine 110, a housing 134 of rotating electric machine 110, ball joints 106 and 108, a brake caliper 112, a brake rotor 114, and vibration damping members 124 and 126.

A support portion 116 is provided protruding on the upper side of housing 134 of rotating electric machine 110, and a ball joint socket portion 130 of ball joint 106 is fixed to support portion 116 by fastening a bolt 162. A support portion 118 is provided protruding on the lower side of housing 134, and a boll joint socket portion 132 of ball joint 108 is fixed thereon by fastening a bolt 164. Ball joint 106 includes a ball stud (not shown), a dust boot 152 and ball joint socket portion 130. Detailed structure of boll joint 106 will be described later. Ball joint 108 includes a ball stud, a dust boot 166 and a ball joint socket portion 132.

The ball stud of ball joint 106 is assembled to pass through upper arm 102, and the thread at the tip end is fastened by a nut 120. The ball stud of ball joint 108 is assembled to pass through lower arm 104, and the thread at the tip end is fastened by a nut 122.

Rotating electric machine includes a rotor and a stator. Housing 134 houses a reduction gear and rotating electric machine 110, that is, the rotor and the stator. The stator is fixed inside housing 134. Inside the stator, the rotor is rotatably supported by a bearing or the like provided in housing 134.

The reduction gear is, for example, a planetary gear consisting of a sun gear, a pinion gear, a ring gear and a planetary carrier. A sun gear shaft is coupled to the rotor of rotating electric machine. Further, a planetary carrier is coupled to a wheel hub (not shown). The wheel hub is rotatably supported by a hub bearing provided in housing 134.

A brake rotor 114 is attached to the wheel hub. Brake rotor 114 may be fixed to the wheel hub by fastening a bolt, or it may be fixed pinched between a wheel disk and the wheel hub by fastening a wheel nut (or bolt) when the wheel disk is mounted.

Further, on housing 134, brake caliper 112 is fixed, by fastening a bolt. Brake caliper 112 is provided with a set of brake pads (not shown). Brake caliper 112 is provided to pinch, from opposite sides, a sliding surface of brake rotor 114, which is the end surface in left/right direction of FIG. 1. When hydraulic pressure applied to brake caliper 112 increases as the driver steps on the brake pedal or the like, the force of pinching brake roller 114 applied by the brake pads increases, generating braking force.

On a wheel attaching surface 128 opposite to the surface to be in contact with the wheel hub of brake rotor 114, a wheel disk having an approximately cup-shape and fixed to a tire (both not shown) is mounted. In the present embodiment, a "wheel" consists of the wheel disk and the tire. In the present embodiment, housing 134 is a "rotation support member" that houses rotating electric machine 110 and supports the wheel in a freely rotatable manner.

In the present embodiment, in-wheel motor 100 constitutes a steering wheel. Specifically, a steering tie rod, not shown, is coupled to housing 134, and rotates a line connecting ball joints 106 and 108 as a rotation axis (king pin axis) so that the wheel turns to the steering direction.

Rotating electric machine 110 is, by way of example, a three-phase AC rotating electric machine. A power cable 136 is electrically connected to rotating electric machine 110. Power cable 136 is electrically connected to an inverter provided on the vehicle body. To the inverter, DC power is supplied from a battery directly or through a converter. The DC power supplied to the inverter is converted to AC power, and supplied through power cable 136 to rotating electric machine 110. When AC power is supplied from the inverter to rotating electric machine 110, magnetic force generates in a coil wound around the stator, so that the rotor receives rotating force in accordance with the flow of magnetic flux. Specifically, driving force that rotates the wheel generates. Here, a capacitor may be used in place of the battery.

Figure 4:
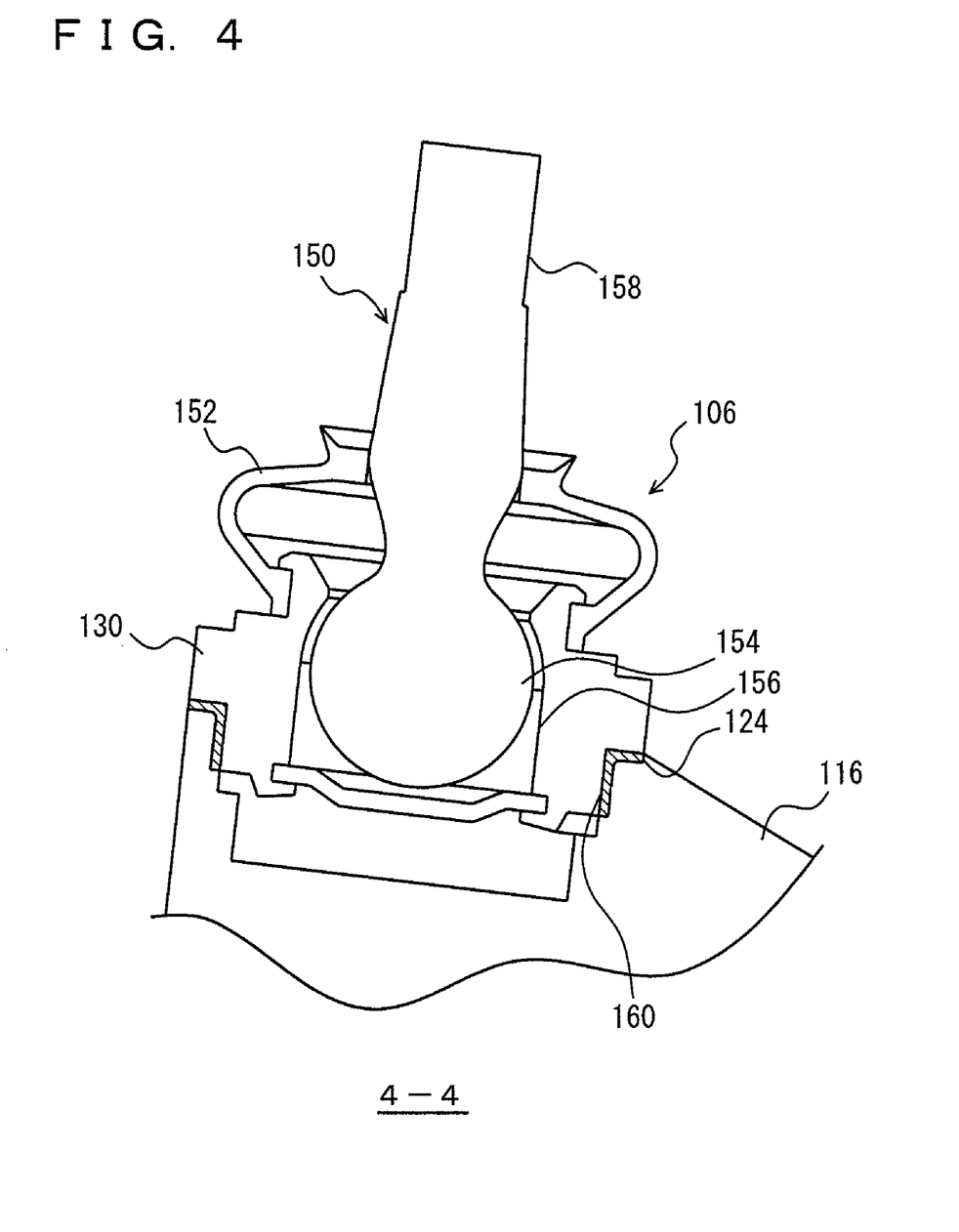
FIG. 4 is a cross-sectional view taken along the line 4-4 of FIG. 2.

FIG. 4 is a cross-sectional view taken along the line 4-4 of FIG. 2. As shown in FIG. 4, ball joint 106 includes ball stud 150, dust boot 152, and ball joint socket portion 130. Inside the ball joint socket portion 130, a receptacle 156 is formed such that a ball portion 154 formed at one end of ball stud 150 does not slip off in the upper direction of the figure from ball joint socket portion 130. At the other end of ball stud 150, a thread 158 is formed, which is passed through upper arm 102 and fastened by a nut 120.

Ball stud 150 is assembled such that it extends from the lower direction of joint socket portion 130 through an opening where receptacle 156 is formed, with the thread 158 positioned upward in the figure. Between the ball portion 154 of ball stud 150 and receptacle 156 of ball joint socket portion 130, grease is filled. Further, a space formed around the shaft of ball stud 150 with ball joint socket portion 130 is covered by dust boot 152. The structure of ball joint 108 is the same as that of ball joint 106 and, therefore, detailed description will not be repeated.

As the ball portion 154 of ball stud 150 and the receptacle of ball joint socket portion 130 slide with each other, the housing is rotatably supported in the steering direction, and the wheel is supported to freely swing upward/downward with respect to the vehicle body.

In a vehicle provided with in-wheel motor 100 having such a structure as described above, it is possible that vibration generated in the in-wheel motor is transmitted to the side of vehicle body. In the vehicle having the in-wheel motor, vibration and noise generated when the motor is driven are in the frequency band of several hundred Hz to several kHz, which are caused by rotor rotation or gear meshing. Such vibration is particularly notable when the vehicle speed is increased and decreased.

The reason for this is that torque reaction force of rotating electric machine 110 when the vehicle speed is increased and decreased is received by ball joints 106 and 108. When ball joints 106 and 108 receive the torque reaction force of rotating electric machine 110, in ball joint 106, for example, ball portion 150 may possibly be in direct contact with receptacle 156 or a wall surface. When ball portion 150 contacts receptacle 156, degree of transmission of vibration generated in rotating electric machine 110 through housing 134, upper arm 102 and lower 104 to the vehicle body increases (in other words, vibration tends to be transmitted easily). As a result, vibration and resultant noise are generated in the vehicle interior, possibly causing sense of discomfort of persons in the vehicle.

Further, at the root portion of a shock absorber and at mounting portions of upper arm 102 and lower arm 104 to the vehicle body, rubber bushes are provided. This realizes a structure in which shock or vibration is not transmitted to the vehicle interior. The rubber bushes, however, correspond only to input vibration of about 10 to about 15 Hz from the road surface. Therefore, high-frequency noise generated in the in-wheel motor cannot be reduced.

In view of the foregoing, the present invention is characterized in that vibration damping members 124 and 126 are provided between housing 134 and mounting portions for mounting rotating electric machine 110 to the vehicle body. In the present embodiment, between ball joint socket portion 130 of ball joint 106 and support portion 116, vibration damping member 124 is provided and between ball joint socket portion 132 of ball joint 108 and support portion 118, vibration damping member 126 is provided, as shown in FIGS. 1-3.

As shown in FIG. 4, in the present embodiment, vibration damping member 124 is formed such that there is formed a space between ball joint socket portion 130 and support portion 116. Specifically, vibration damping member 124 has a sheet-shaped portion so that a space is formed on the upper direction in FIG. 4 with respect to ball joint socket portion 130. Further, vibration damping member 124 has a hollow cylindrical portion that covers an outer circumferential surface of a cylindrical portion 160 formed to have a cylindrical shape at a lower portion of ball joint socket portion 130. Thus, vibration damping member 124 realizes a positional relation that ball joint socket portion 130 and support portion 116 are not in contact with each other. Thickness of vibration damping member 124 may be substantially constant, or it may be changed portion to portion. For instance, when the vehicle speed is increased and decreased, boll stud 150 in ball joint 106 comes to be in contact with receptacle 156 in the front/rear direction of the vehicle. Therefore, at the hollow cylindrical portion covering the outer circumferential surface of cylindrical portion 160 of vibration damping member 124, thickness in the front/rear direction of the vehicle may be made thicker than in the left/right direction.

Vibration damping member 126 is also formed in the similar manner so that there is formed a space between ball joint socket portion 132 and support portion 118. Vibration damping member 126 realizes the positional relation that ball joint socket portion 132 and support portion 118 are not in contact with each other. Thickness of vibration damping member 126 may also be made thicker in the front/rear direction of the vehicle than in the left/right direction.

Though vibration damping members 124 and 126 are members formed of rubber or resin material, it is not limiting and any member may be used as long as it can curb (that is, absorb) the transmission of vibration in a frequency band higher than the vibration of about 10 to about 15 Hz from the road surface addressed by the rubber bush described above. For instance, vibration damping members 124 and 126 may be formed of vibration damping steel plate, or honeycomb member. In the present embodiment, vibration damping member 124 and 126 are rubber-based vibration damping members that absorb vibration of several hundred Hz to several kHz generated when rotating electric machine 110 operates.

The function of in-wheel motor in accordance with the present embodiment having the structure as above will be described in the following.

Assume that the vehicle speed of the vehicle having in-wheel motor 100 is increased and decreased. When the vehicle is running forward and the speed is to be increased, electric power is supplied from the inverter to rotating electric machine 110, so that rotating force is applied to the wheel and acceleration of the vehicle starts. When rotating force generates in the rotor of rotating electric machine 110, rotating force in the opposite direction to the wheel rotation (hereinafter simply referred to as torque reaction force at the time of acceleration) generates in housing 134 in which the stator is fixed.

The torque reaction force at the time of acceleration generated in housing 134 acts on the rear side of the vehicle with respect to upper arm 102 at support portion 116, while it acts on the front side of the vehicle with respect to lower arm 104 at support portion 118. As a result, ball stud 150 of ball joint 106 comes to be in contact with that portion of receptacle 156 which is on the front side of the vehicle. Ball stud of ball joint 108 comes to be in contact with that portion of the receptacle which is on the rear side of the vehicle. At this time, at the contact portion between ball stud 150 in ball joint 106 and receptacle 156, degree of transmission of vibration from ball joint socket portion 130 to ball stud 150 increases (in other words, vibration tends to be transmitted easily). Degree of vibration transmission increases similarly at the contact portion in ball joint 108.

When the vehicle is running forward and the speed is to be decreased, electric power is generated by regenerative braking in rotating electric machine 110. At this time, rotating force in the same direction as the wheel rotation (hereinafter simply referred to as torque reaction force at the time of deceleration) generates.

The torque reaction force at the time of deceleration generated in housing 134 acts on the front side of the vehicle at support portion 116, while it acts on the rear side of the vehicle at support portion 118. As a result, ball stud 150 of ball joint 106 comes to be in contact with that portion of receptacle 156 which is on the rear side of the vehicle. Ball stud of ball joint 108 comes to be in contact with that portion of the receptacle which is on the front side of the vehicle. At this time, at the contact portion between ball stud 150 in ball joint 106 and receptacle 156, degree of transmission of vibration from ball joint socket portion 130 to ball stud 150 increases (in other words, vibration tends to be transmitted easily). Degree of vibration transmission increases similarly at the contact portion in ball joint 108.

The high-frequency vibration caused by the operation of rotating electric machine 110 is transmitted through housing 134 to support portions 116 and 118, and by vibration damping members 124 and 126, transmission to ball joint socket portions 130 and 132 is curbed. Therefore, when the vehicle speed is increased and decreased, even if the degree of vibration transmission at ball joint 106 increases, transmission of high-frequency vibration generated in rotating electric machine 110 can be reduced by vibration damping members 124 and 126.

As described above, in the in-wheel motor in accordance with the present invention, a vibration damping member is provided between the housing and the ball joint as the mounting portion of the housing to the vehicle body. The vibration damping member is a member that curbs high-frequency vibration generated in the rotating electric machine. When torque reaction force of rotating electric machine is applied to the ball joint when the vehicle speed is increased and decreased, the degree of vibration transmission from the support portion to the vehicle body increases at a portion where the ball stud comes into contact with the receptacle. However, transmission of high-frequency vibration to the vehicle body can be reduced by the vibration damping member. Therefore, an in-wheel motor that reduces high-frequency vibration transmitted to the vehicle body when vehicle speed is increased and decreased can be provided.

In the present embodiment, the vibration damping member is provided to prevent contact between the ball joint socket portion and the support portion. It is not limiting and the vibration damping member may be provided, for example, at a position corresponding to the portion where the degree of vibration transmission to the vehicle body is large when the vehicle speed is increased and decreased. Specifically, vibration damping members may be provided at positions off-set by a prescribed amount from where the vertical line passes to the front and rear sides of the vehicle. For instance, when the vehicle speed is increased and decreased, the ball stud and the ball joint socket portion come to be in contact at positions off-set by a prescribed amount in the front/rear direction of the vehicle from the position where the vertical line passes. Therefore, the vibration damping member may be interposed at a portion where ball joint socket portion and the support portion are to be in contact at least in the front/rear direction of the vehicle. By this arrangement also, high-frequency vibration transmitted from the housing to the vehicle body can be reduced.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. An in-wheel motor, comprising:
    a rotating electric machine applying a driving force to a wheel;
    a rotation support member as a housing of said rotating electric machine, rotatably supporting said wheel; and
    a vibration damping member provided between said rotation support member and a mounting portion for mounting said rotation support member to a vehicle body, wherein the vibration damping member further comprises a hollow cylindrical portion, and wherein a thickness of the hollow cylindrical portion is greater in a portion of the hollow cylindrical portion that is closer to a front and rear direction of the vehicle body than in a portion of the hollow cylindrical portion that is closer to a left and right direction of the vehicle body.
2. The in-wheel motor according to claim 1, wherein said vibration damping member curbs vibration of a predetermined frequency band which corresponds to the vibrations generated by torque reaction force of said rotating electric machine when speed of a vehicle increases and decreases.

3. The in-wheel motor according to claim 2, wherein said predetermined frequency band is approximately several hundred Hertz (Hz) to several kilohertz (kHz).

4. The in-wheel motor according to claim 1, wherein said vibration damping members are provided at positions off-set by a prescribed amount from where a vertical line passes at the mounting portions to the front and rear sides of a vehicle, respectively.

5. The in-wheel motor according to claim 1, wherein said wheel is a steering wheel that rotates and turns to the steering direction when steered;
a suspension arm is provided on said rotation support member for suspending said vehicle body through said mounting portion; and
said mounting portion supports said rotation support member such that said wheel freely rotates in said steering direction with respect to said vehicle body and supports said rotation support member such that said wheel freely swings upward/downward with respect to said vehicle body.

6. The in-wheel motor according to claim 1, wherein said mounting portion is a ball joint.

7. The in-wheel motor according to claim 1, wherein the vibration damping member is formed of a rubber material.

8. The in-wheel motor according to claim 1, wherein the vibration damping member is formed of a vibration damping steel plate.

9. The in-wheel motor according to claim 1, wherein the vibration damping member is formed of a honeycomb member.

10. An in-wheel motor, comprising:
a rotating electric machine applying a driving force to a wheel;
a rotation support member as a housing of said rotating electric machine, rotatably supporting said wheel; and
a vibration damping member provided between said rotation support member and a mounting portion for mounting said rotation support member to a vehicle body, wherein said vibration damping member curbs vibration of a predetermined frequency band which corresponds to the vibrations generated by torque reaction force of said rotating electric machine when speed of a vehicle increases and decreases.

11. The in-wheel motor according to claim 10, wherein said predetermined frequency band is approximately several hundred Hertz (Hz) to several kilohertz (kHz).

* * * * *